United States Patent
Khatri et al.

(10) Patent No.: US 12,265,625 B2
(45) Date of Patent: Apr. 1, 2025

(54) PHYSICAL PORT VALIDATION FOR INFORMATION HANDLING SYSTEMS

(71) Applicant: Dell Products, L.P., Round Rock, TX (US)

(72) Inventors: Mukund P. Khatri, Austin, TX (US); Marshal F. Savage, Austin, TX (US); Jason Matthew Young, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 429 days.

(21) Appl. No.: 17/508,930

(22) Filed: Oct. 22, 2021

(65) Prior Publication Data

US 2023/0127223 A1 Apr. 27, 2023

(51) Int. Cl.
*G06F 21/57* (2013.01)
*G06F 13/20* (2006.01)
*H04L 9/32* (2006.01)

(52) U.S. Cl.
CPC ........... *G06F 21/575* (2013.01); *G06F 13/20* (2013.01); *G06F 2213/40* (2013.01)

(58) Field of Classification Search
CPC ........ G06F 21/575; G06F 21/57; G06F 13/20; G06F 2213/40; H04L 9/3268
USPC .............................................. 726/18–19, 22
See application file for complete search history.

(56) References Cited

U.S. PATENT DOCUMENTS

| | | | |
|---|---|---|---|
| 10,311,224 B1 * | 6/2019 | Farhan | G06F 21/57 |
| 11,599,642 B2 * | 3/2023 | Young | G06F 21/575 |
| 11,863,691 B2 * | 1/2024 | Savage | H04L 9/3268 |
| 2004/0193883 A1 * | 9/2004 | Alperin | G06F 21/575 |
| | | | 713/170 |
| 2006/0117377 A1 * | 6/2006 | Frenkiel | G06F 21/57 |
| | | | 726/2 |
| 2009/0240713 A1 * | 9/2009 | Jia | H04L 41/0866 |
| 2020/0349251 A1 * | 11/2020 | Iyer | G06F 21/85 |
| 2022/0207126 A1 * | 6/2022 | Young | H04L 9/3268 |

* cited by examiner

*Primary Examiner* — Bharat Barot
(74) *Attorney, Agent, or Firm* — Fogarty LLP

(57) ABSTRACT

Systems and procedures are provided for validating an IHS (Information Handling System) as operating using only factory-provisioned I/O ports. During factory provisioning of the IHS, a signed inventory certificate that includes an inventory of factory-provisioned I/O ports of the IHS is uploaded to the IHS. Upon delivery and initialization of the IHS, the inventory certificate is retrieved by a pre-boot validation process. An inventory of detected I/O ports of the IHS is then collected. The validation process compares the collected inventory of detected I/O ports against the inventory of factory-provisioned I/O ports from the inventory certificate in order to validate the IHS is operating using only factory-provisioned I/O ports. Through embodiments, any I/O ports of the IHS other than the I/O ports validated as factory-provisioned are not usable by any software or hardware of the IHS.

20 Claims, 7 Drawing Sheets

PHYSICAL PORT VALIDATION FOR INFORMATION HANDLING SYSTEMS

FIELD

The present disclosure relates generally to Information Handling Systems (IHSs), and relates more particularly to IHS security.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some types of IHSs, such as mobile phones and tablets, are typically manufactured in large quantities and with few variations. For instance, for a particular model of mobile phone or tablet, hundreds of thousands of identical, or nearly identical, devices may be manufactured. Other types of IHSs, such as rack-mounted servers, are manufactured in much smaller quantities and are frequently manufactured and customized according to specifications provided by a specific customer that has contracted for the manufacture and delivery of the server. In such instances, a customer may specify various hardware and/or software customizations that configure the server to support specific functionality. For example, a customer may contract for manufacture and delivery of a server that includes security adaptations that will enable the server to securely process high volumes of financial transactions. Providing such customizability with regards to hardware can result in an IHS manufacturer supporting different product variants, such as supporting different motherboards that are adapted for certain computing functions. In some customization scenarios, customers may request IHSs with use of only certain physical I/O ports in order to reduce the security footprint of the IHS. Supporting such customizations through additional product variants results in increased cost and complexity.

SUMMARY

Various embodiments provide methods for validating an IHS (Information Handling System). The methods may include: retrieving an inventory certificate uploaded to the IHS during factory provisioning of the IHS, wherein the inventory certificate includes an inventory identifying a plurality of factory-provisioned I/O ports of the IHS; collecting an inventory of detected I/O ports of the IHS; and comparing the collected inventory of detected I/O ports against the inventory of factory-provisioned I/O ports from the inventory certificate in order to validate the IHS is operating using only factory-provisioned I/O ports.

In some method embodiments, the inventory of factory-provisioned I/O ports included in the inventory certificate is based on a listing of enabled I/O ports for the IHS specified by a purchaser of the IHS. In some method embodiments, the validation that only factory-provisioned I/O ports are operational on the IHS is conducted by a pre-boot validation process of the IHS. In some method embodiments, the pre-boot validation process is implemented by a remote access controller of the IHS. In some method embodiments, the inventory certificate including the inventory of factory-provisioned I/O ports is uploaded to a persistent memory of the IHS during the factory provisioning of the IHS. In some method embodiments, any I/O ports of the IHS other than the I/O ports validated as factory-provisioned are not usable by any software or hardware of the IHS. In some method embodiments, the I/O ports comprise at least one of: a data port, a video port, a network port, a debugging port, and an audio port. In some embodiments, methods may further include receiving an updated inventory certificate that specifies updated factory-provisioned I/O ports for the IHS. In some method embodiments, the comparison of the collected inventory against the inventory from the inventory certificate identifies any I/O ports of the IHS that are operational and are not factory-provisioned.

In various additional embodiments, IHSs are provided that may include: a plurality of I/O ports, wherein during factory provisioning of the IHS an inventory certificate is uploaded to the IHS, wherein the inventory certificate includes an inventory that identifies a plurality of the I/O ports that are factory-provisioned I/O ports that are enabled for use; one or more processors; and one or more memory devices coupled to the processors, the memory devices storing computer-readable instructions that, upon execution by the processors, cause the IHS to: retrieve the signed inventory certificate uploaded during factory provisioning of the IHS; collect an inventory of detected I/O ports of the IHS; and compare the collected inventory of detected I/O ports against the inventory of factory-provisioned I/O ports from the inventory certificate in order to validate the IHS is operating using only factory-provisioned I/O ports.

In some IHS embodiments, the inventory of factory-provisioned I/O ports included in the inventory certificate is based on a listing of enabled I/O ports for the IHS specified by a purchaser of the IHS. In some IHS embodiments, any of the I/O ports of the IHS other than the I/O ports validated as factory-provisioned are not usable by any software or hardware of the IHS. In some IHS embodiments, the inventory certificate including the inventory identifying the plurality of factory-provisioned I/O ports is uploaded to a persistent memory of the IHS during the factory provisioning of the IHS. In some IHS embodiments, the I/O ports comprise at least one of: a data port, a video port, a network port, a debugging port, and an audio port. In some IHS embodiments, execution of the instructions by the processors further causes the IHS to receive an updated inventory certificate that specifies updated factory-provisioned I/O ports for the IHS.

In various additional embodiments, computer-readable storage devices include instructions stored thereon for validating secure assembly and delivery of an IHS (Information Handling System). Execution of the instructions by one or more processors of the IHS causes a validation process of the IHS to: retrieve an inventory certificate uploaded to the IHS during factory provisioning of the IHS, wherein the inventory certificate includes an inventory identifying a plurality of factory-provisioned I/O ports of the IHS; collect an inventory of detected I/O ports of the IHS; and compare the collected inventory of detected I/O ports against the inventory of factory-provisioned I/O ports from the inventory certificate in order to validate the IHS is operating using only factory-provisioned I/O ports.

In some storage device embodiments, the validation that only factory-provisioned I/O ports are operational on the IHS is conducted by a pre-boot validation process of the IHS. In some storage device embodiments, the pre-boot validation process is implemented by a remote access controller of the IHS. In some storage device embodiments, the storage device comprises a storage device of the remote access controller. In some storage device embodiments, the inventory certificate is uploaded to the storage device of the remote access controller during the factory provisioning of the IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
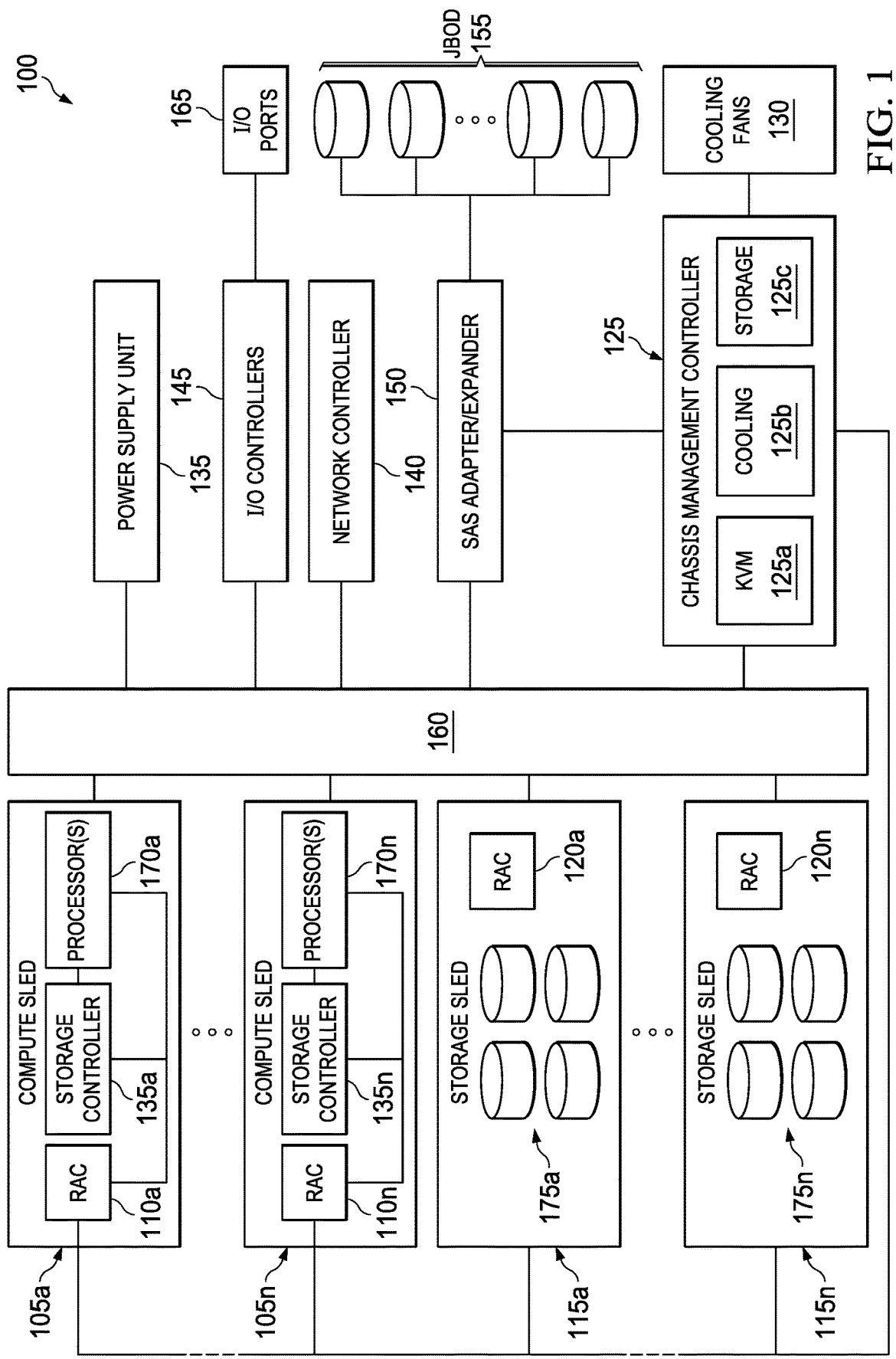
FIG. 1 is a diagram illustrating certain components of a chassis, according to some embodiments, configured for validating that the chassis has use of only factory-provisioned I/O ports.

FIG. 1 is a block diagram illustrating certain components of a chassis 100 comprising one or more compute sleds 105a-n and one or more storage sleds 115a-n that may be configured to implement the systems and methods described herein for validating that the chassis 100 has use of only factory-provisioned I/O ports 165. Embodiments of chassis 100 may include a wide variety of different hardware configurations. Such variations in hardware configuration may result from chassis 100 being factory assembled to include components specified by a customer that has contracted for manufacture and delivery of chassis 100. As described in additional detail below, chassis 100 may include capabilities that allow a customer to validate the operational status of a physical port of chassis 100 is the same as when the chassis was supplied to the customer. For instance, a customer that has contracted for chassis 100 to be configured without possible use of an I/O port 165 of the chassis may utilize embodiments to validate that chassis has use of only factory-provisioned I/O ports 165 of chassis.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135. In some embodiments, a backplane 160 may be uniquely identified based on a code or other identifier that may be permanently encoded in a non-volatile memory of the backplane 160 by its manufacturer. As described below, embodiments may support validation of backplane 160 as being the same backplane that was installed at the factory during the manufacture of chassis 100.

Figure 2:
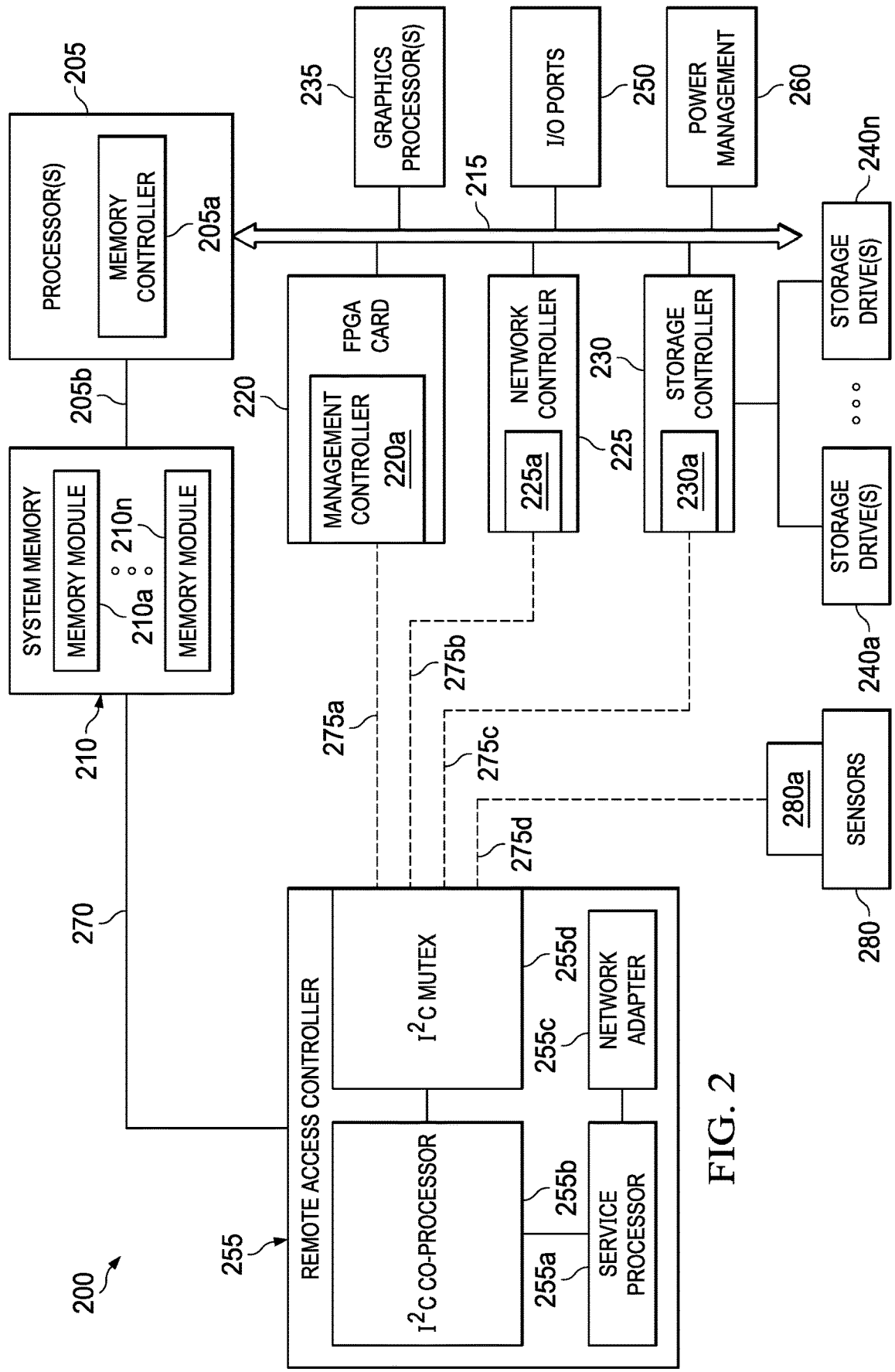
FIG. 2 is a diagram illustrating certain components of an IHS configured as a component of a chassis, according to some embodiments, for validating that the IHS has use of only factory-provisioned I/O ports.

In certain embodiments, a compute sled 105a-n may be an IHS such as described with regard to IHS 200 of FIG. 2. A compute sled 105a-n may provide computational processing resources that may include one or more processors 170a-n and may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controllers 110a-n may collect various types of sensor data, such as collecting temperature sensor readings that are used in support of airflow cooling of the chassis 100 and the sleds 105a-n, 115a-n. In addition, each remote access controller 110a-n may implement various monitoring and administrative functions related to compute sleds 105a-n that utilize sideband bus connections with various internal components of the respective compute sleds 105a-n.

In some embodiments, each compute sled 105a-n installed in chassis 100 may be uniquely identified based on a code or other identifier that may be permanently encoded in a non-volatile memory of a respective compute sled 105a-n by its manufacturer. As described below, embodiments support validation of each compute sled 105a-n as being a compute sled that was installed at the factory during the manufacture of chassis 100. Also as described below, during a provisioning phase of the factory assembly of chassis 100, a signed certificate that specifies hardware components of chassis 100 that were installed during its manufacture may be stored in a non-volatile memory accessed by a remote access controller 110a-n of a compute sled 105a-n. Using this signed inventory certificate, a customer may validate that the hardware components of chassis 100 and/or compute sled 105a-n are the same components that were installed at the factory during its manufacture. As described in additional detail below, embodiments allow a customer to validate that chassis 100 has use of only factory-provisioned I/O ports 165 of chassis.

Each of the compute sleds 105a-n may include a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located. In some embodiments, a SAS expander 150 and storage drive 155 may be uniquely identified based on a code or other identifier that may be permanently encoded in a non-volatile memory of the SAS expander 150 or storage drive 155 by its respective manufacturer. In instances where SAS expander 150 and storage drives 155 are factory installed, as described below, embodiments may support validation of SAS expander 150 and storage drives 155 as being the same SAS expander and storage drives that were installed at the factory during the manufacture of chassis 100.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100. As illustrated, each storage sled 115a-n includes a remote access controller (RAC) 120a-n provides capabilities for remote monitoring and management of respective storage sleds 115a-n. In some embodiments, each storage sled 115a-n may be uniquely identified based on a code or other identifier that may be permanently encoded in a non-volatile memory of the respective storage sled 115a-n by its manufacturer. As described below, embodiments support validation of each storage sled 115a-n as being a storage sled that was installed at the factory during the manufacture of chassis 100.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. In some embodiments, a network controller 140 may be uniquely identified based on a code or other identifier that may be permanently encoded in a non-volatile memory of the network controller 140 by its manufacturer. As described below, embodiments support validation of network controller 140 as being the same network controller that was installed at the factory during the manufacture of chassis 100.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. In some embodiments, a power supply unit 135 may be uniquely identified based on a code or other identifier that may be permanently encoded in a non-volatile memory of the power supply unit 135 by its manufacturer. As described below, embodiments support validation of power supply unit 135 as being the same power supply unit that was installed at the factory during the manufacture of chassis 100.

Chassis 100 may also include various I/O controllers 145 that may support various I/O ports 165, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100. In some embodiments, each I/O controller 145 may be uniquely identified based on a code or other identifier that may be permanently encoded in a non-volatile memory of the respective I/O controller 140 by its manufacturer. As described below, embodiments support validation of I/O controllers 140 as being the same I/O controllers that were installed at the factory during the manufacture of chassis 100. As described in additional detail below, embodiments allow a customer to validate that chassis 100 has use of only factory-provisioned I/O ports 165 of chassis.

The chassis management controller 125 may also include a storage module 125c that provides capabilities for managing and configuring certain aspects of the storage devices of chassis 100, such as the storage devices provided within storage sleds 115a-n and within the JBOD 155. In some embodiments, a chassis management controller 125 may be uniquely identified based on a code or other identifier that may be permanently encoded in a non-volatile memory of the chassis management controller 125 by its manufacturer. As described below, embodiments support validation of chassis management controller 125 as being the same chassis management controller that was installed at the factory during the manufacture of chassis 100.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for validating that the IHS has use of only factory-provisioned I/O ports 250. It should be appreciated that although the embodiments described herein may describe an IHS that is a compute sled or similar computing component that may be deployed within the bays of a chassis, other embodiments may be utilized with other types of IHSs, such as servers, desktops and laptops, that may also support validation of the secure assembly and delivery of the IHS 200. In the illustrative embodiment of FIG. 2, IHS 200 may be a computing component, such as compute sled 105a-n or other type of server, such as an 1RU server installed within a 2RU chassis, that is configured to share infrastructure resources provided by a chassis 100.

The IHS 200 of FIG. 2 may be a compute sled, such as compute sleds 105a-n of FIG. 1, that may be installed within a chassis, that may in turn be installed within a rack. Installed in this manner, IHS 200 may utilize shared power, network and cooling resources provided by the chassis and/or rack. Embodiments of IHS 200 may include a wide variety of different hardware configurations. Such variations in hardware configurations may result from IHS 200 being factory assembled to include components specified by a customer that has contracted for manufacture and delivery of IHS 200. As described in additional detail below, IHS 200 may include capabilities that allow a customer to validate that the hardware components of IHS 200 are the same hardware components that were installed at the factory during its manufacture. Also as described in additional detail below, embodiments further allow a customer to validate that IHS 200 has use of only factory-provisioned I/O ports 250.

IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications. In some embodiments, each of the processors 205 may be uniquely identified based on a code or other identifier that may be permanently encoded in a respective processor 205 by its manufacturer. As described below, embodiments support validation of processors 205 as being the same processors that were installed at the factory during the manufacture of IHS 200.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b. The system memory 210 is coupled to processor(s) 205 via a memory bus 205a that provides the processor(s) 205 with high-speed memory used in the execution of computer program instructions by the processor(s) 205. Accordingly, system memory 210 may include memory components, such as static RAM (SRAM), dynamic RAM (DRAM), NAND Flash memory, suitable for supporting high-speed memory operations by the processor (s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory. In some embodiments, each of the memory modules 210a-n may be uniquely identified based on a code or other identifier that may be permanently encoded in a respective memory module 210a-n by its manufacturer. As described below, embodiments support validation of memory modules 210a-n as being the same memory modules that were installed at the factory during the manufacture of IHS 200

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex.

IHS 200 may also include one or more I/O ports 250, such as USB ports, PCIe ports, TPM (Trusted Platform Module) connection ports, HDMI ports, audio ports, docking ports, network ports, Fibre Channel ports and other storage drive ports. Such I/O ports 250 may be externally accessible or may be internal ports that are accessed by opening the enclosure of the IHS 200. Through couplings made to these I/O ports 250, users may couple the IHS 200 directly to other IHSs, storage resources, external networks and a vast variety of peripheral components. If left unsecured, such I/O ports 250 may provide opportunities for malicious actors to download data from IHS 200 and/or to upload malicious code to IHS 200. Accordingly, some customers contracting for manufacture and shipment of an IHS 200 may specify that certain I/O ports 250 remain disabled, with no ability for the disabled ports to be enabled or used in any manner. Embodiments thus provide capabilities by which only selected I/O ports 250 of IHS 200 are enabled for use during factory provisioning of the IHS 200, with all other ports permanently disabled absent re-provisioning of the IHS 200 by the factory, or by another trusted administrator. Based on factory-provisioned inventory information that specifies the I/O ports 250 of IHS 200 that are usable, once IHS 200 has been delivered, customers may validate that IHS 200 has use of only factory-provisioned I/O ports 250.

As illustrated, IHS 200 may include one or more FPGA (Field-Programmable Gate Array) cards 220. Each of the FPGA card 220 supported by IHS 200 may include various processing and memory resources, in addition to an FPGA logic unit that may include circuits that can be reconfigured after deployment of IHS 200 through programming functions supported by the FPGA card 220. Through such reprogramming of such logic units, each individual FGPA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units, each of which may be separately programmed to implement different computing operations, such as in computing different operations that are being offloaded from processor 205. The FPGA card 220 may also include a management controller 220a that may support interoperation with the remote access controller 255 via a sideband device management bus 275a. In some embodiments, each of the FPGA cards 220 installed in IHS 200 may be uniquely identified based on a code or other identifier that may be permanently encoded in the FPGA card 220 by its manufacturer. As described below, embodiments support validation of FPGA card 220 as being the same FPGA card that was installed at the factory during the manufacture of IHS 200.

IHS 200 may include one or more storage controllers 230 that may be utilized to access storage drives 240a-n that are accessible via the chassis in which IHS 100 is installed. Storage controller 230 may provide support for RAID (Redundant Array of Independent Disks) configurations of logical and physical storage drives 240a-n. In some embodiments, storage controller 230 may be an HBA (Host Bus Adapter) that provides more limited capabilities in accessing physical storage drives 240a-n. In some embodiments, storage drives 240a-n may be replaceable, hot-swappable storage devices that are installed within bays provided by the chassis in which IHS 200 is installed. In embodiments where storage drives 240a-n are hot-swappable devices that are received by bays of chassis, the storage drives 240a-n may be coupled to IHS 200 via couplings between the bays of the chassis and a midplane of IHS 200. In some embodiments, storage drives 240a-n may also be accessed by other IHSs that are also installed within the same chassis as IHS 100. Storage drives 240a-n may include SAS (Serial Attached SCSI) magnetic disk drives, SATA (Serial Advanced Technology Attachment) magnetic disk drives, solid-state drives (SSDs) and other types of storage drives in various combinations. As described below, embodiments support validation of storage drives 240a-n as being the same storage drives installed at the factory during the manufacture of IHS 200. In some embodiments, storage controller 230 may be uniquely identified based on a code or other identifier that may be permanently encoded in a non-volatile memory of storage controller 230 by its manufacturer. As described below, embodiments support validation of storage controller 230 as being the same storage controller that was installed at the factory during the manufacture of IHS 200.

Processor(s) 205 may also be coupled to a network controller 225 via in-band bus 215, such as provided by a Network Interface Controller (NIC) that allows the IHS 200 to communicate via an external network, such as the Internet or a LAN. In some embodiments, network controller 225 may be a replaceable expansion card or adapter that is coupled to a motherboard connector of IHS 200. In some embodiments, network controller 225 may be an integrated component of IHS 200. In some embodiments, network controller 225 may be uniquely identified based on a code or other identifier, such as a MAC address, that may be permanently encoded in a non-volatile memory of network controller 225 by its manufacturer. As described below, embodiments support validation of network controller 225 as being the same network controller that was installed at the factory during the manufacture of IHS 200.

A variety of additional components may be coupled to processor(s) 205 via in-band bus 215. For instance, processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255. In some embodiments, components such as power management unit 260 and graphics processor 235 may also be uniquely identified based on a code or other identifier that may be permanently encoded in a non-volatile memory of these components by their respective manufacturer. As described below, embodiments support validation of these components as being components that were installed at the factory during the manufacture of IHS 200.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255. As described in additional detail below, in some embodiments, BIOS may be configured to identify hardware components that are detected as being currently installed in IHS 200. In such instances, the BIOS may support queries that provide the described unique identifiers that have been associated with each of these detected hardware components by their respective manufacturers. In providing an abstraction layer by which hardware of IHS 200 is accessed by an operating system, BIOS may identify the I/O ports 250 that are recognized and available for use. As described in additional detail below, embodiments may utilize an inventory certificate that is stored to the IHS during factory provisioning and that specifies the factory-provisioned I/O ports 250 of IHS 200. Embodiments may utilize such an inventory certificate during a pre-boot initialization of IHS 200 in order to enable, such as through BIOS configurations, only these factory-provisioned I/O ports 250 of IHS 200.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 255 that supports remote management of IHS 200 and of various internal components of IHS 200.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the operating system of IHS 200 (i.e., in a bare-metal state). In some embodiments, certain operations of the remote access controller 225, such as the described inventory certificate generation and validation operations, may operate using validated instructions, and thus within the root of trust of IHS 200.

In some embodiments, remote access controller 255 may be uniquely identified based on a code or other identifier that may be permanently encoded in a non-volatile memory of the remote access controller 255 by its manufacturer. As described below, embodiments support validation of remote access controller 255 as being the same controller that was installed at the factory during the manufacture of IHS 200. Also as described below, during a provisioning phase of the factory assembly of IHS 200, a signed certificate that specifies factory installed hardware components of IHS 200 that were installed during manufacture of the IHS 200 may be stored in a non-volatile memory that is accessed by remote access controller 255. Using this signed inventory certificate stored by the remote access controller 255, a customer may validate that the detected hardware components of IHS 200 are the same hardware components that were installed at the factory during manufacture of IHS 200. Also as described below, embodiments further allow use of this signed inventory certificate stored by the remote access controller 255 to validate that IHS 200 has use of only factory-provisioned I/O ports 250.

In support of the capabilities for validating the detected hardware components of IHS 200 against the inventory information that is specified in a signed inventory certificate, remote access controller 255 may support various cryptographic capabilities. For instance, remote access controller 255 may include capabilities for key generation such that remote access controller may generate keypairs that include a public key and a corresponding private key. As described in additional detail below, using generated keypairs, remote access controller 255 may digitally sign inventory information collected during the factory assembly of IHS 200 such that the integrity of this signed inventory information may be validated at a later time using the public key by a customer that has purchased IHS 200. Using these cryptographic capabilities of the remote access controller, the factory installed inventory information that is included in an inventory certificate may be anchored to a specific remote access controller 255, since the keypair used to sign the inventory information is signed using the private key that is generated and maintained by the remote access controller 255.

In some embodiment, the cryptographic capabilities of remote access controller 255 may also include safeguards for encrypting any private keys that are generated by the remote access controller and further anchoring them to components within the root of trust of IHS 200. For instance, a remote access controller 255 may include capabilities for accessing hardware root key (HRK) capabilities of IHS 200, such as for encrypting the private key of the keypair generated by the remote access controller. In some embodiments, the HRK may include a root key that is programmed into a fuse bank, or other immutable memory such as one-time programmable registers, during factory provisioning of IHS 200. The root key may be provided by a factory certificate authority, such as described below. By encrypting a private key using the hardware root key of IHS 200, the hardware inventory information that is signed using this private key is further anchored to the root of trust of IHS 200. If a root of trust cannot be established through validation of the remote access controller cryptographic functions that are used to access the hardware root key, the private key used to sign inventory information cannot be retrieved. In some embodiments, the private key that is encrypted by the remote access controller using the HRK may be stored to a replay protected memory block (RPMB) that is accessed using security protocols that require all commands accessing the RPMB to be digitally signed using a symmetric key and that include a nonce or other such value that prevents use of commands in replay attacks. Stored to an RPMG, the encrypted private key can only be retrieved by a component within the root of trust of IHS 200, such as the remote access controller 255. In some embodiments, the remote access controller 255 may rely on certain cryptographic capabilities of a TPM, such as in generating keypairs, calculating cryptographic signatures (e.g., hashes) and/or providing a persistent and secure memory for storage of the keypair used by the hardware validation procedures described in more detail below.

Utilizing its cryptographic capabilities, a remote access controller 255 may generate CSRs (certificate signing requests) that are usable in requesting an identity certificate, such as an X.509 certificate, from a certificate authority. A CSR generated by remote access controller 255 may be submitted to a certificate authority that may attest to ownership by the remote access controller 255 of the private key that corresponds to a public key included in the CSR. As described in additional detail below, CSRs generated by a remote access controller 255 may include an inventory of the factory-installed hardware components of the IHS 200, where the inventory information is signed by the remote access controller 255. This signed inventory information included in the inventory certificate may then be used to validate the detected hardware of the IHS 200 as genuine factory-installed components.

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of an I2C multiplexer 255d of the remote access controller. As illustrated, certain of the managed devices of IHS 200, such as non-standard hardware 220, network controller 225 and storage controller 230, are coupled to the IHS processor(s) 205 via an in-line bus 215, such as a PCIe root complex, that is separate from the I2C sideband bus connections 275a-d used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255a of remote access controller 255 may rely on an I2C co-processor 255b to implement sideband I2C communications between the remote access controller 255 and managed components 220, 225, 230, 280 of the IHS. The I2C co-processor 255b may be a specialized co-processor or microcontroller that is configured to interface via a sideband I2C bus interface with the managed hardware components 220, 225, 230, 280 of IHS. In some embodiments, the I2C co-processor 255b may be an integrated component of the service processor 255a, such as a peripheral system-on-chip feature that may be provided by the service processor 255a. Each I2C bus 275a-d is illustrated as single line in FIG. 2. However, each I2C bus 275a-d may be comprised of a clock line and data line that couple the remote access controller 255 to I2C endpoints 220a, 225a, 230a, 280a which may be referred to as modular field replaceable units (FRUs).

As illustrated, the I2C co-processor 255b may interface with the individual managed devices 220, 225, 230, 280 via individual sideband I2C buses 275a-d selected through the operation of an I2C multiplexer 255d. Via switching operations by the I2C multiplexer 255d, a sideband bus connection 275a-d may be established by a direct coupling between the I2C co-processor 255b and an individual managed device 220, 225, 230, 280. In providing sideband management capabilities, the I2C co-processor 255b may each interoperate with corresponding endpoint I2C controllers 220a, 225a, 230a, 280a that implement the I2C communications of the respective managed devices 220, 225, 230. The endpoint I2C controllers 220a, 225a, 230a, 280a may be implemented as a dedicated microcontroller for communicating sideband I2C messages with the remote access controller 255, or endpoint I2C controllers 220a, 225a, 230a, 280a may be integrated SoC functions of a processor of the respective managed device endpoints 220, 225, 230, 280.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
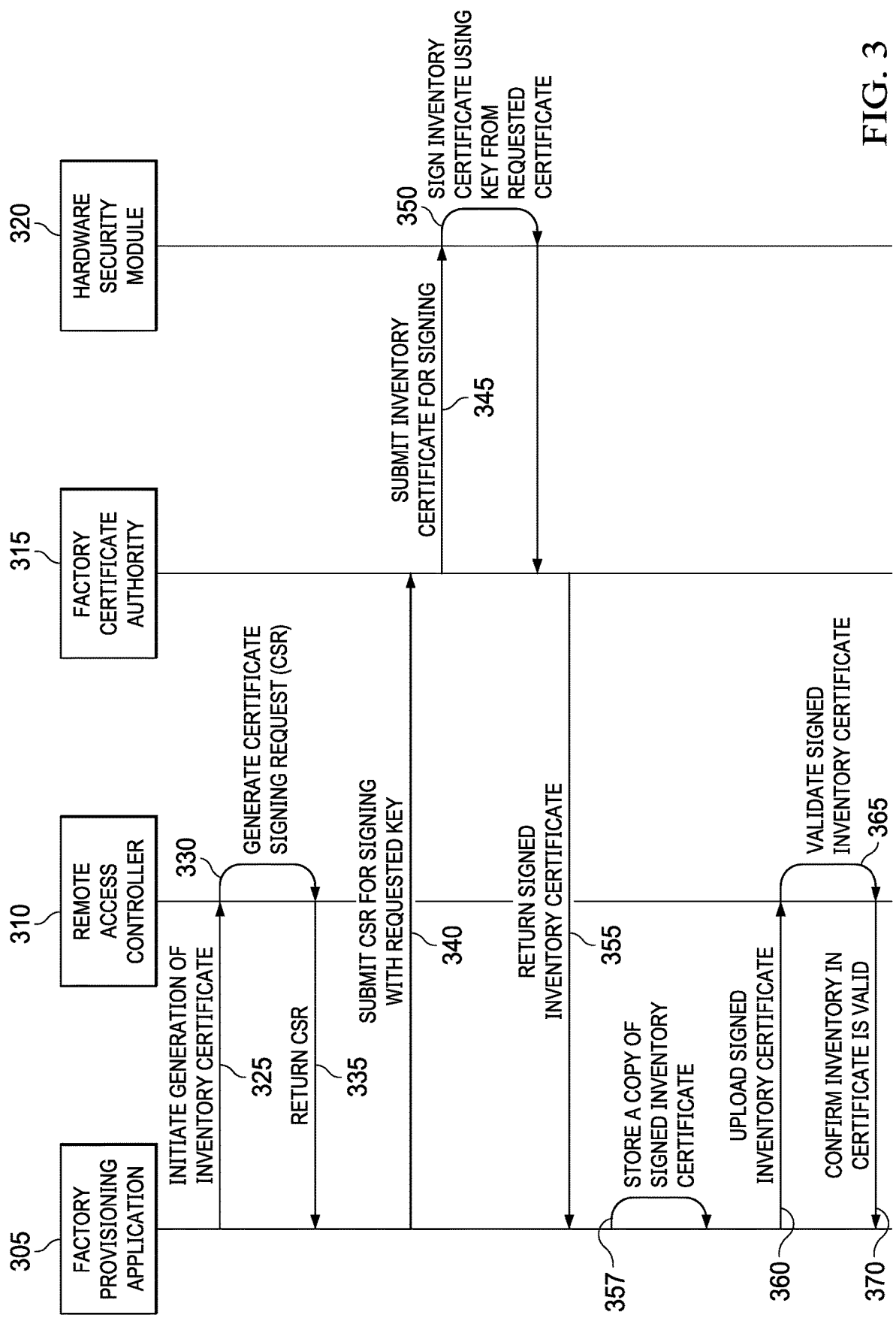
FIG. 3 is a swim lane diagram illustrating certain responsibilities of components of a system configured according to certain embodiments for factory provisioning of an IHS for validating that, once deployed, the IHS has use of only factory-provisioned I/O ports.
Figure 4:
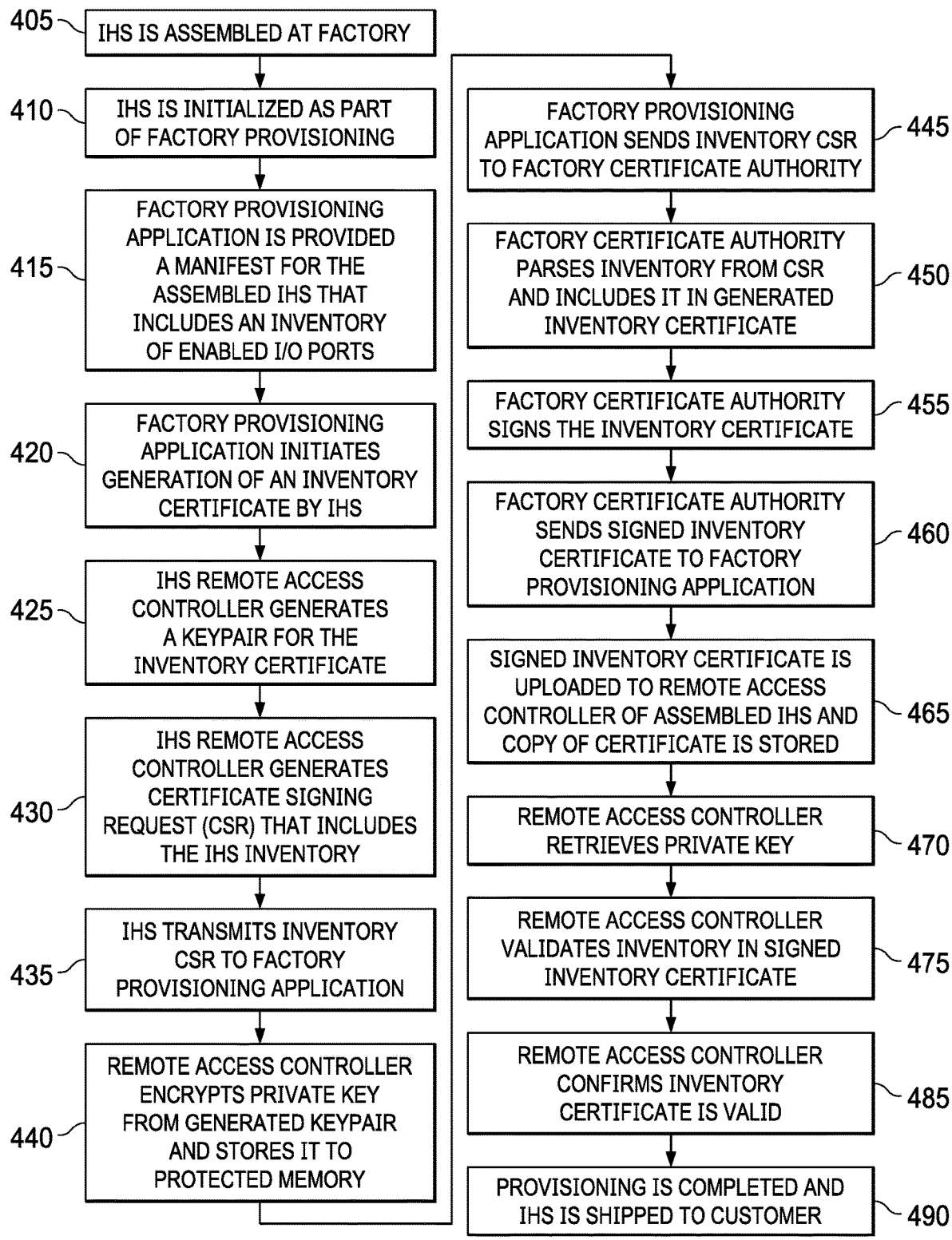
FIG. 4 is a flowchart describing certain steps of a method, according to some embodiments, for assembly and factory provisioning of an IHS for validating that, once deployed, the IHS has use of only factory-provisioned I/O ports.

FIG. 3 is a swim lane diagram illustrating certain responsibilities of components of a system according to certain embodiments for factory provisioning of an IHS for validating that, once it has been deployed, the IHS has use of only factory-provisioned I/O ports. FIG. 4 is a flowchart describing certain steps of a method, according to some embodiments, for assembly and factory provisioning of an IHS for validating that, once it has been deployed, the IHS has use of only factory-provisioned I/O ports. Some embodiments of the method of FIG. 4 may begin, at block 405, with the factory assembly of an IHS, such as the assembly of a server described with regard to FIGS. 1 and 2. In some instances, an IHS may be manufactured using a factory process that includes multiple phases of assembly, validation and provisioning that must be completed before the IHS is supplied to a customer. As described, an IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a manifest that tracks the individual hardware components that are installed in an IHS. As described above, the installed hardware components may include standard components and may also include specialized components that have been requested by a specific customer that has contracted for the assembly and delivery of an IHS. As described with regard to FIG. 2, once assembled, an IHS may include various I/O ports, such as ports accessible via the motherboard or backplane of an IHS, ports provided via an expansion card coupled to the IHS, and/or ports that are components of a chassis in which IHS is installed. In some instances, instructions for assembly and provisioning of an IHS for a particular customer may specify a set of I/O ports of the IHS that are to be available for use, with any other I/O ports to be disabled in a manner that precludes their use in any form without additional factory provisioning of the IHS. In such instances, embodiments may specify these factory-provisioned I/O ports within the manifest that tracks the hardware components that are installed in the IHS during its factory assembly.

Once the assembly of an IHS has been completed, the IHS may be subjected to manual and automated inspections that confirm the IHS has been properly assembled and does not include any defects. After confirming an IHS has been assembled without any manufacturing defects, at block 410, factory provisioning of the IHS may be initiated. In some instances, the provisioning of an IHS at the factory may include various stages that may include stages for loading of firmware, configuring hardware components, and installing an operating system and other software. As indicated in FIG. 3, various aspects of this factory provisioning process may be conducted using a factory provisioning application, where this factory provisioning application may run on one or more servers and may interface with an IHS that is being provisioned once a requisite amount of firmware and software has been installed to the IHS.

As described, a manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. In some embodiments, the manifest may specify a set of I/O ports of the IHS that are to be available for use, with any other I/O ports disabled in a manner that prevents their use by any software program, hardware component or user of the IHS. These manifest entries that identify enabled I/O ports may specify unique identifiers, serial numbers, address information and/or other characteristics that may be used to identify a physical port of an IHS.

At block 415, a manifest including an installed hardware inventory is provided to the factory provisioning application that is being used to provision the assembled IHS. Based on the hardware inventory provided in the manifest, at block 420, the factory provisioning application may initiate generation of an inventory certificate that may be used to validate that the detected hardware components of the IHS are the same hardware components that were installed during the factory assembly of the IHS and/or to validate that an IHS has use of only factory-provisioned I/O ports.

As described with regard to FIGS. 1 and 2, an IHS may include a remote access controller that provides capabilities for remote management of an IHS, where these remote management capabilities may include sideband management of various hardware components of an IHS. As indicated in FIG. 3, the generation of an inventory certificate for a newly assembled IHS may be initiated, at 325, via a request from the factory provisioning application 305 to the remote access controller 310 of the IHS. As described with regard to FIG. 2, a remote access controller of an IHS may include cryptographic capabilities that operate within the root of trust of the IHS and that include the ability to generate cryptographic keypairs. Utilizing such cryptographic capabilities, at block 425, the remote access controller 310 initiates the generation of an inventory certificate by generating a cryptographic key pair for use in validating the authenticity of inventory information, including an inventory of the enabled I/O ports, that is included in an inventory certificate.

At block 430 and at 330, the remote access controller 310 generates a certificate signing request (CSR) for a digital identity certificate, where the request specifies the public key of the key pair generated by the remote access controller and also specifies the factory installed hardware inventory from the manifest that was generated during assembly of the IHS, which includes an inventory of the enabled I/O ports of the IHS. In addition, the generated CSR includes a digital signature that is derived through operations of the remote access controller 310 from the inventory of factory installed hardware components, where this inventory may be in the form of the hardware manifest that is generated in the assembly of the IHS and that is provided as an input to the factory provisioning 305. The factory installed and provisioned hardware inventory information included in the CSR may be signed by the remote access controller using the private key from the generated keypair. At block 435 and at 335, the CSR for the requested inventory certificate is transmitted to the factory provisioning application 305 by the remote access controller 310. At block 440, the remote access controller safeguards the private key from the generated key pair. In some embodiments, the remote access controller may encrypt the private key using the hardware root key (HRK) of the IHS and may store the encrypted key to a protected memory, such as the replay protected memory block that is described with regard to FIG. 2.

Upon receiving the certificate signing request from the remote access controller 310, at block 445 and at 340, the factory provisioning application 305 submits the CSR for signing by a factory certificate authority 315. In some embodiments, the factory provisioning application 305 specifies a factory key to be used by the factory certificate authority 315 in signing the inventory certificate. For instance, the factory provisioning application may include the name of a trusted certificate associated with a factory key as an attribute of the CSR that is transmitted to the factory certificate authority 315. Upon receipt of the CSR, at block 450, the factory certificate authority parses from the CSR: the hardware inventory signed by the remote access controller 310, including the enabled I/O ports, the public key generated by the remote access controller and the information specifying the requested signing key. Based on the information parsed from the CSR, the factory certificate authority generates a digital identity certificate, referred to herein as an inventory certificate, that is associated with the public key provided by the remote access controller and that specifies the factory installed hardware inventory of the IHS, including the I/O ports that have been enabled. As described below, at a later time, this inventory certificate may be updated or replaced through additional factory provisioning in order to enable or disable I/O ports of the IHS.

As indicated in FIG. 3, at 345, the factory certificate authority 315 submits the generated inventory certificate for signing by a hardware security module 320 that may be a dedicated hardware component of a factory provisioning server that safeguards cryptographic keys and implements cryptographic functions utilized in the factory provisioning process. In some embodiments, the factory certificate authority 315 may also specify a certificate name associated with a signing key that is maintained by the hardware security module 320. At 350, the hardware security module 320 utilizes the private key associated with the specified certificate in order to digitally sign the submitted inventory certificate, which includes the inventory of the factory installed hardware components of the IHS and the enabled I/O ports. The signed inventory certificate is then returned to the factory certificate authority 315 by the hardware security module 320.

Once the inventory certificate has been signed, at block 460 and at 355, the signed inventory certificate is transmitted from the factory certificate authority 315 to the factory provisioning application 305. As indicated in FIG. 3 at 357, the factory provisioning application 305 may store a copy of the signed inventory certificate. In some instances, the copy may be saved to a data store utilized in providing ongoing support of the IHS once it has been shipped and has been deployed by a customer. As described below with regard to FIG. 7, using this stored copy of the signed inventory certificate, the manufacture of the IHS, or another trusted entity, may provide the IHS with an updated inventory certificate that specifies an updated set of I/O ports that are available for use.

At block 465 and at 360, the signed inventory certificate is than loaded to the assembled IHS. As indicated in FIG. 3, in some embodiments, the signed inventory certificate may be uploaded to a remote access controller 310 of the assembled IHS, such that the signed inventory certificate may be stored to a nonvolatile memory or other persistent storage that is accessible by the remote access controller 310 independent from the operating system of the IHS. In other embodiments, the signed inventory certificate may be uploaded without reliance on the remote access controller to another non-volatile memory of the IHS.

Some embodiments may continue, at 365, with the validation of the signed inventory certificate by the remote access controller 310. Using the public key from the generated keypair, at block 475, the remote access controller decrypts the signature included by the remote access controller in the CSR and confirms that the inventory information included in the signed inventory certificate matches the inventory information that was submitted in the certificate signing request, thus validating the integrity of the generation of the signed inventory certificate. At block 485, the remote access controller confirms that the inventory included in the signed inventory certificate is valid and, at 370, the remote access controller 310 confirms the validity of the inventory certificate with a notification to the factory provisioning application 305. With the generation and validation of the signed inventory certificate completed, additional factory provisioning of the assembled IHS may be completed and, at block 490, the assembled IHS may be shipped from the factory to a customer.

Figure 5:
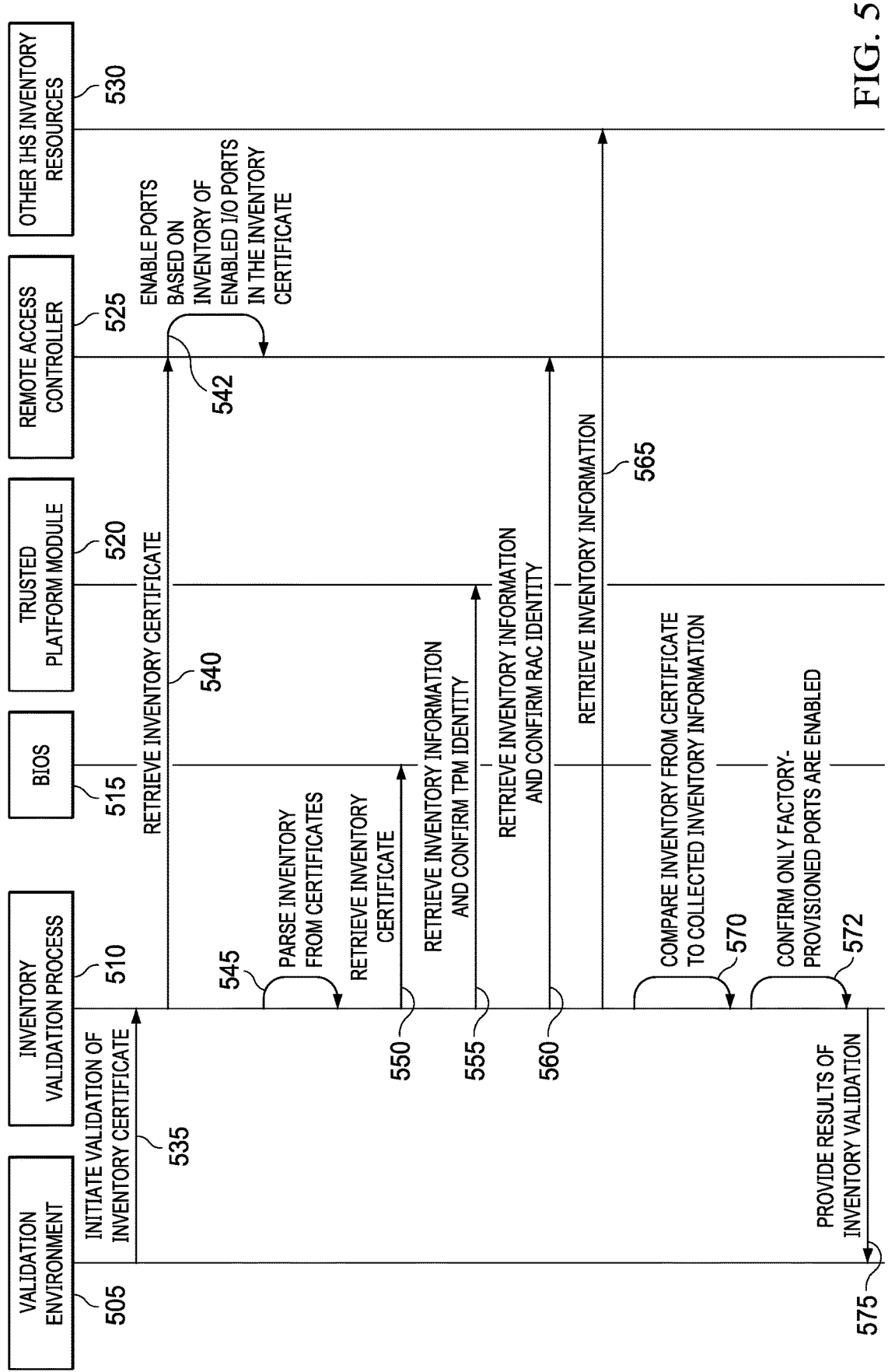
FIG. 5 is a swim lane diagram illustrating certain responsibilities of components of an IHS configured according to certain embodiments for configuring and validating the use of only factory-provisioned I/O ports by an IHS.
Figure 6:
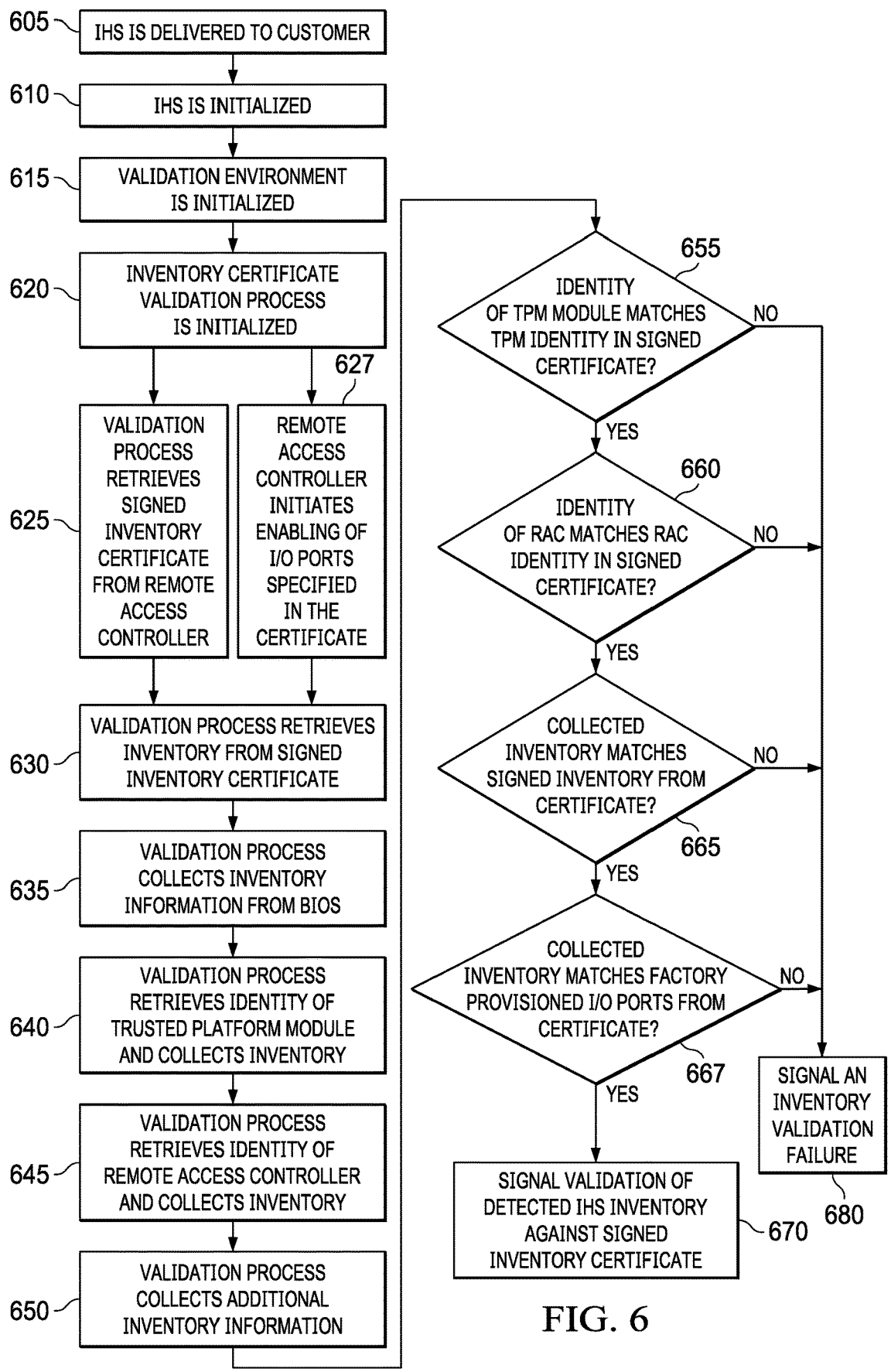
FIG. 6 is a flowchart describing certain steps of an additional method, according to some embodiments, for configuring and validating the use of only factory-provisioned I/O ports by an IHS.

FIG. 5 is a swim lane diagram illustrating certain responsibilities of components of an IHS configured according to certain embodiments for configuring and validating the use of only factory-provisioned I/O ports by an IHS. FIG. 6 is a flowchart describing certain steps of a method, according to some embodiments, for configuring and validating the use of only factory-provisioned I/O ports by an IHS. Embodiments may begin, at block 605, with the delivery of an IHS to a customer, where the IHS has been assembled and provisioned according to the procedures set forth above. In embodiments, the delivered IHS has been provisioned at the factory to include a signed inventory certificate that specifies an inventory of factory installed hardware of the IHS and/or factory-provisioned I/O ports of the IHS.

Upon receiving an IHS that has been configured in this manner, at block 610, the IHS may be unpacked, assembled and initialized by an administrator. In some instances, an IHS may be ready for immediate deployment by a customer. In other instances, an IHS may require further provisioning by a customer before the IHS is deployed, such as for operation within a particular data center. As such, in various instances, an IHS may be unpacked, assembled and initialized in order to deploy the IHS or to prepare it for further provisioning. At block 615, the IHS has been powered and validation process 510 is initialized within a validation environment 505. In some instances, the validation process 510 may be initialized as part of the initial provisioning of an IHS by a customer. In other instances, the validation process may be initialized upon the customer installing new and/or replacement hardware components in the IHS. In some embodiments, the validation process 510 may run within a pre-boot validation environment 505, such as a PXE (Preboot eXecution Environment) validation environment. In some embodiments, a PXE validation environment 505 in which a validation process 510 runs may be retrieved from a network location and may thus be executed using the processing and memory capabilities of the IHS. In some embodiments, a PXE validation environment may be retrieved using secure protocols, such as HTTPS, in order to assure the integrity of the validation environment instructions that are utilized. In some embodiments, a pre-boot validation environment 505 in which the validation process 510 runs may include an environment that is executed by the remote access controller of the IHS based on validated firmware instructions. In these embodiments that utilize a pre-boot validation environment 505, the validation of the detected hardware components of the IHS is conducted prior to booting of the operating system of the IHS.

In some embodiments, the validation process may run as part of a diagnostic mode that is supported by an IHS. For instance, an IHS may support a diagnostic mode that may be initiated by a user, or may be initiated automatically in response to detecting various conditions, where the diagnostic mode may support various diagnostic tools, including the described hardware validation procedures. In some embodiments, the diagnostic mode may involve re-booting the IHS to a diagnostic environment, while other embodiments may support diagnostic mode operations that run within the operating system of the IHS. Accordingly, some embodiments may support the described hardware validation procedures as a feature available within the operating system of the IHS. In such embodiments, the operating system may be configured to periodically conduct the described hardware validation procedures, such as on a daily or weekly basis. The operating system may likewise be configured to conduct the hardware validation procedures in response to a detected security notification, such as a notification that a process is attempting to access a protected resource. In some embodiments, the described validation procedures may be implemented remotely, such as via the described HTTPS protocols, where the remote validation procedures may rely both on information retrieved from the IHS via HTTPS and on remote information, such as information maintained by the manufacturer of the IHS or by an entity supporting the administration of the IHS.

As described, at block 620 and as indicated at 535 of FIG. 5, an inventory certificate validation process 510 is initiated within a validation environment 505 that may include a pre-boot environment, a diagnostic environment or other environment supporting the validation process. In some embodiments, the inventory certificate validation process 510 operates based on validated instructions, such as based on instructions that, when used to calculate a hash value, are confirmed to correspond to a value stored in an immutable memory of the IHS during its factory provisioning. In this manner, the inventory certificate validation process 510 may be added to the root of trust of the IHS. At block 625 and as indicated at 540, the inventory certificate validation process 510 retrieves the signed inventory certificate from the remote access controller 525 or from a persistent memory of the IHS. As described above, the factory provisioning process may include uploading the signed inventory certificate to the remote access controller or to a persistent memory of the IHS.

As illustrated both in FIGS. 5 and 6, in some embodiments, the retrieval of the inventory certificate by the remote access controller 525 also triggers, at 542 and at 627, the enabling of some, all or none of the physical I/O ports of the IHS. As described, the factory provisioning of an IHS according to embodiments may include generating an inventory of I/O ports of the IHS that are to be enabled, with any other I/O ports of the IHS to remain disabled in a manner that renders them unusable for any purpose. Upon retrieving the inventory certificate, the remote access controller 525 may use the public key in the certificate to validate the integrity of the inventory information included in the certificate before parsing the identities of the factory-enabled I/O ports from the inventory information. As described above, the inventory included in the certificate may identify enabled I/O ports based on various types of identifiers, such as addresses and serial numbers associated with individual I/O ports.

Based on such inventory information, the remote access controller 525 may interface with various resources of the IHS to enable only the I/O ports included in the inventory of factory-provisioned I/O ports. As described with regard to FIG. 2, a remote access controller may support various sideband management connections that may be utilized to interface with managed hardware resources of an IHS. Accordingly, in some embodiments, the remote access controller may interface with the BIOS of the IHS through such sideband management connections in order to enumerate and support only the I/O ports specified as available for use in the inventory certificate. For instance, the BIOS of the IHS may be configured to receive an inventory of I/O ports from the remote access controller 525 and to permanently discard all references to any other I/O ports that have been identified by the BIOS during its initialization. In this manner, any I/O ports that have been identified but that are not included in the inventory certificate are no longer recognized by the BIOS, and thus are not provided by the BIOS as available I/O ports to any component of the IHS that interfaces the BIOS in order to access hardware of the IHS. In this same manner, the remote access controller may similarly utilize sideband management connections to interface with network controllers, storage controller, TPM controllers, FPGA cards and other components that may be configured to receive an inventory of enabled I/O ports and to permanently discard all references to any other I/O ports that are identified.

Once the remote access controller 525 has completed enabling of only the factory-provisioned I/O ports based on the inventory certificate, the remote access controller may provide the validation process 510 with a copy of inventory certificate. At this point, the validation process 510 may initiate generation of an inventory of all of the hardware components of the IHS. Accordingly, at block 630 and as indicated at 545, the inventory certificate validation process 510 may parse the hardware inventory information from the signed inventory certificate. Using the public key provided in the signed inventory certificate, the inventory validation process 510 may confirm the integrity of the inventory information that is included in the signed inventory certificate. In particular, the validation process 510 may utilize the private key of the keypair generated by the remote access controller 525 during factory provisioning to calculate a signature based on the inventory included in the certificate. If this signature matches the signed inventory signature included in the certificate, the integrity of the inventory included in the certificate is confirmed. If the inventory information included in the certificate does not match the signed inventory included in the certificate, a core validation failure specifying a corrupted inventory certificate may be signaled.

If the validity of the certificate is confirmed, the validation process 510 collects an inventory of the detected hardware components of the IHS. In some instances, this collection of inventory information may be initiated earlier by the inventory certificate validation process, such as during initialization of the IHS and its components. At block 635 and as indicated at 550, the inventory certificate validation process 510 may query the BIOS 515 of the IHS for an inventory of hardware components that have been detected by BIOS 515, including an inventory of physical I/O ports that are reported as detected by the BIOS. At block 640 and as indicated at 555, the inventory certificate validation process 510 may retrieve additional hardware inventory information from a Trusted Platform Module (TPM) 520 of the IHS, which may also specify I/O ports recognized by the TPM. In some instances, the TPM 520 may identify hardware components that are also identified by BIOS 515. However, in some instances, the TPM 520 may identify certain hardware components, such as secure memory modules, that are not identified by BIOS 515.

As described with regard to FIG. 2, a Trusted Platform Module may serve to establish an initial hardware root of trust in an IHS such that the hardware components within this root of trust operate using validated software instructions. Accordingly, in some embodiments, the inventory validation process 510 may compare identity information for the detected TPM 520 against the TPM identity information that is parsed from the inventory certificate at block 545. In some instances, the detection of any discrepancies between the identity of the TPM specified in the inventory certificate and the identity reported by a detected TPM 520 may result in terminating any further validation procedures.

At block 645 and as indicated at 560, the inventory certificate validation process 510 may retrieve additional hardware inventory information from a remote access controller 525 of the IHS. As with TPM 520, remote access controller 525 may provide redundant identification of some hardware components and may provide exclusive identification of other hardware components, such as internal memories, management controllers or logic units utilized by the remote access controller 525. Also as with TPM 520, in some embodiments, the inventory certificate validation process 510 may compare identity information for the detected remote access controller 525 against the remote access controller identity information that is parsed from the inventory certificate at block 545. In some instances, the detection of any discrepancies between the identity of the remote access controller specified in inventory certificate and the identity reported by remote access controller 525 may also result in terminating any further validation procedures.

At block 650 and as indicated at 565, the inventory certificate validation process 510 may retrieve any additional inventory information from any other data sources, such as directly from the processor of the IHS or from a chassis management controller of a chassis in which the IHS has been installed. Upon collecting the detected hardware components of the initialized IHS, at block 570, the inventory certificate validation process compares the collected inventory information against the inventory information that is parsed from the signed inventory certificate, and in particular against the signed inventory of factory-installed hardware of the IHS. However, prior to validating the detected hardware, at block 655, the inventory certificate validation process may first confirm the identity of the detected TPM against the identity of the TPM reported in the signed inventory certificate. If the identity of the TPM is successfully validated, validation may continue at block 660. However, if the identity of the TPM is not validated, at block 680, the inventory certificate validation process may signal an inventory validation failure since any discrepancies between the identity of the factory-installed TPM and the TPM that has been detected in the initialized IHS signals a potential compromise in the root of trusted hardware components of the IHS.

At block 660, the inventory certificate validation process may confirm the identity of the detected remote access controller against the identity of the remote access controller reported in the signed inventory certificate. If the remote access controller is successfully validated, validation may continue at block 665. Otherwise, if the identity of the remote access controller is not validated, at block 680, the inventory certificate validation process may signal an inventory validation failure. As with the TPM, any discrepancies between the identity of the factory-installed remote access controller and the remote access controller detected in the initialized IHS signals a potential compromise of the root of trust of the IHS.

At block 665, the inventory certificate validation process continues the comparison of the detected hardware components of the initialized IHS against the identities of the hardware components that are included in the signed inventory certificate, and in particular against the signed inventory of the factory installed hardware components that is included in the signed inventory certificate. In implementing this comparison, the validation process 510 may generate a digital signature based on the collected hardware inventory data, in some cases using cryptographic operations supported by the remote access controller 525 or by another trusted component of the IHS. If the digital signature calculated from the inventory of detected components matches the signed hardware inventory from the certificate, the validation process 510 has successfully confirmed that the IHS includes only factory-installed hardware, with none of the factory-installed hardware missing and no detection of any unidentified hardware. The customer receiving delivery of the IHS is thus assured that the IHS is operating using only the factory-installed hardware components specified in the inventory certificate. In such scenarios, at block 670, the validation process 510 signals a successful validation of the detected hardware of the IHS against the factory-provisioned inventory certificate.

If any devices of any type are detected that are not identified the inventory of factory-installed hardware, at block 680, the inventory certificate validation process may signal an inventory validation failure. In some embodiments, an inventory validation failure will also be signaled if the validation process 510 is unable to detect a factory-installed hardware component that is specified in the inventory certificate, such that successful validation requires confirming that an IHS is operating using all of the factory-provisioned hardware, but no additional hardware.

Upon successfully validating the hardware in use by the IHS, embodiments may continue, at 667 and at 572, with the validation process 510 confirming that only the factory-provisioned I/O ports of the IHS are enabled and available for use. In some embodiments, the inventory of detected hardware provided, at 550, by BIOS 515 may specify all I/O ports, such as USB ports and PCIe ports, that are recognized by the BIOS and that are available for use through the BIOS. In some embodiments, additional components may also specify recognized I/O ports in their collected hardware inventory that is reported to the inventory validation process 510. Based on all such received reports of detected I/O ports, the inventory validation process 510 may compare the detected I/O ports that are available for use against the inventory of factory-provisioned I/O ports. If any I/O ports are detected that are not present in the inventory of factory-provisioned I/O ports, at block 680, the inventory certificate validation process may signal an inventory validation failure and may prevent further booting of the IHS. In instances where a factory-provisioned I/O port is not detected, embodiments may signal an inventory validation failure, or may provide a notification and allow continued use of the IHS.

If the detected I/O ports match the factory-provisioned I/O ports, at block 670, the inventory certificate validation process signals a successful validation of the detected hardware of the IHS, including validation that the IHS is operating using only factory-provisioned I/O ports. The customer receiving delivery of the IHS is thus assured that the IHS is operating using only hardware components that were installed at the factory during manufacture of the IHS and that the IHS does not provide use of any I/O ports other than factory-provisioned I/O ports.

Figure 7:
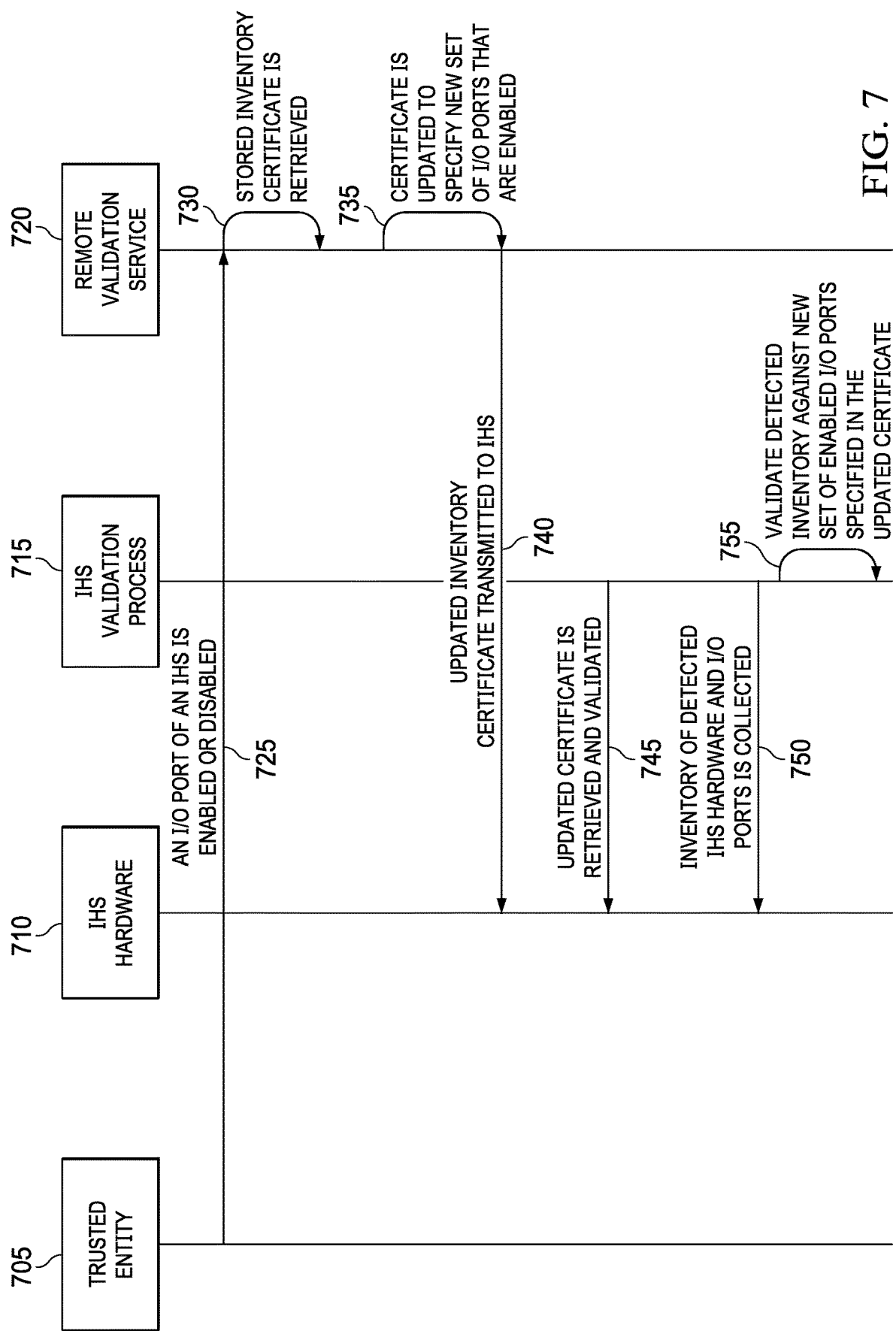
FIG. 7 is a swim lane diagram illustrating certain responsibilities of components of a system configured according to certain embodiments for updating and validating the use of only factory-provisioned I/O ports by an IHS.

FIGS. 5 and 6 describe embodiments for use of an inventory certificate in the validation of an IHS as including only genuine hardware components, where the inventory certificate may be an original inventory certificate generated during factory provisioning of the IHS, or may be an updated inventory certificate that has been generated by a trusted validation service, such as in response to modifications to the hardware components of an IHS. FIG. 7 describes the generation of an updated inventory certificate by a remote validation service in response to one or more I/O ports of an IHS being enabled or disabled.

FIG. 7 is a swim lane diagram illustrating responsibilities of components of a system configured according to certain embodiments for updating and validating the use of only factory-provisioned I/O ports by an IHS. As described, factory provisioning of an IHS according to embodiments generates a signed inventory certificate that specifies the factory-installed hardware components of the IHS, including the I/O ports of the IHS that are enabled for use. An inventory certificate is signed by a factory certificate authority and stored on the IHS. In some embodiments, the factory provisioning application stores a copy of the signed inventory certificate for later use, such as use by the remote validation service 720 in supporting modifications to the IHS at a later time. Once the factory provisioning of the IHS has been completed, the IHS is packaged and shipped to a customer. As described with regard to FIGS. 5 and 6, upon receiving shipment of the IHS, the customer may validate that the IHS has use of only factory-provisioned I/O ports and, in some cases, may also validate that the IHS includes only factory-installed hardware components.

Use of the IHS may proceed with use of only the factory-provisioned I/O ports until modifications to the available I/O ports are deemed necessary. For instance, a customer may repurpose an IHS in a manner that does not require any changes to the hardware components of the IHS, but does require enabling certain I/O ports of the IHS, such as a USB port. In another instance, a customer may elect to disable an I/O port of an IHS, such as a JTAG debug port, in conjunction with the IHS being shipped for operation in a different location. In such instances where the set of enabled I/O ports of an IHS will be modified, at 725, a trusted entity 705 may notify the remote validation service 720 of the change, such as by specifying an updated set of enabled I/O ports or by specifying the disabling or enabling of a specific I/O port. In various embodiments, a trusted entity 705 providing an update to the factory-provisioned I/O ports may include the manufacturer of the IHS, the customer, a retailer that sells replacement parts on behalf of the manufacturer, or by a trusted third party providing ongoing support of the IHS.

In response to a trusted entity 705 providing an update to the factory-provisioned I/O ports, at 730, the remote validation service 720 retrieves the copy of the existing inventory certificate for the IHS, such as from a repository maintained by the manufacturer of the IHS. At 735, the remote validation service 720 generates a new signed inventory certificate that specifies the updated set of I/O ports of the IHS that are enabled, with any other I/O ports of the IHS to be unavailable for any use. In some embodiments, the updated inventory certificate that is generated by the remote validation service 720 may be signed by a factory certificate authority that utilizes a hardware security module, such as described with regard to FIGS. 3 and 4. In some embodiments, the new signed inventory certificate may be signed by a different certificate authority that is utilized by the manufacturer of the IHS or by a trusted entity 705 that is providing ongoing support of IHS.

At block 740, the remote validation service 720 transmits the updated inventory certificate to the IHS, where the updated certificate may be validated and then stored by the remote access controller, as described above, such that it replaces or augments the prior inventory certificate. Upon detecting the receipt of an updated inventory certificate, at 745 of FIG. 7, the validation process 715 may retrieve the updated inventory certificate and confirm the updated certificate corresponds to the root of trust of the IHS. As provided above, an inventory certificate may specify identity information for hardware components that operate within the root of trust of an IHS, such as a remote access controller and a TPM. When factory-provisioned I/O ports of an IHS are being enabled and disabled, such changes do not affect the cryptographic binding of an inventory certificate to the IHS. Accordingly, the root of trust of an IHS should not affected by enabling or disabling of I/O ports. The validation process 715 may thus confirm that the updated inventory certificate is bound to the root of trust of the IHS before evaluating the updated list of factory-provisioned I/O ports included in the updated certificate. If the updated certificate is confirmed as bound to the root of trust of the IHS, validation process 715 may also validate the integrity of the updated inventory information included in the updated inventory certificate.

The validation process 715 may then initiate procedures for comparing the detected hardware inventory of the IHS, including the detected I/O ports, against the inventory reported in the updated inventory certificate, including the factory-provisioned I/O ports. As described above, such inventory validations may be conducted by the validation process 715 in a pre-boot environment or diagnostic environment during which the operating system of the IHS is not operational. As such, evaluation of an updated inventory certificate may trigger re-booting of an IHS in order to initialize such pre-boot or diagnostic environments. Operating within such a pre-boot environment, at 750, the validation process 715 retrieves an inventory of the detected hardware components of the IHS, including the detected I/O ports, as described with regard to FIGS. 5 and 6. At 755, the validation process 715 determines whether the detected hardware inventory of the IHS matches the inventory reported in the updated inventory certificate, including whether the detected I/O ports match the factory-provisioned I/O ports specified in the updated certificate. If no discrepancies are identified with regard to the I/O ports, the customer may be assured that the IHS is operating using only factory-provisioned I/O ports. However, if an I/O port is detected that is not identified in the inventory of factory-provisioned I/O ports from the updated inventory certificate, the validation process 715 may suspend further operations and may notify the user that the IHS is operating using an unauthorized I/O port.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for validating an IHS (Information Handling System) comprising a plurality of I/O (Input/Output) ports, the method comprising:
   retrieving an inventory certificate uploaded to the IHS during factory provisioning of the IHS, wherein the inventory certificate includes an inventory specifying a portion of the plurality of I/O ports of the IHS to be enabled;
   collecting an inventory of detected I/O ports of the IHS;
   comparing the collected inventory of detected I/O ports against the inventory of the portion of I/O ports to be enabled from the inventory certificate in order to validate the IHS is operating using only the portion of the I/O ports included in the inventory certificate that was uploaded to the factory-provisioning of the IHS; and
   disabling detected I/O ports of the IHS that are not validated as ne of the portion of the I/O ports to be enabled based on the comparison to the factory-provisioned inventory certificate.

2. The method of claim 1, wherein the portion of I/O ports included in the inventory certificate is based on a listing that is specified by a purchaser of the IHS and that is used during factory-provisioning to generate the inventory certificate that is uploaded to the IHS, wherein the portion of I/O ports comprises I/O ports of the IHS selected for enabling by the purchaser of the IHS.

3. The method of claim 1, wherein the validation that only the portion of the I/O ports to ben enabled are operational and that no other detected ports are operational on the IHS is conducted by a pre-boot validation process of the IHS.

4. The method of claim 3, wherein the pre-boot validation process is implemented by a remote access controller of the IHS, and wherein the inventory certificate uploaded to the IHS during factory provisioning of the IHS is an identity certificate generated based on certificate signing request issued by the embedded controller.

5. The method of claim 3, wherein the inventory certificate including the portion of I/O ports to be enabled is uploaded by the embedded controller to a persistent memory of the IHS during the factory provisioning of the IHS.

6. The method of claim 1, wherein the detected I/O ports of the IHS that are disabled are not usable by any software or hardware of the IHS.

7. The method of claim 1, wherein the plurality of I/O ports comprise at least one of: a data port, a video port, a network port, a debugging port, and an audio port.

8. The method of claim 1, further comprising:
   receiving an updated inventory certificate that specifies an updated portion of the I/O ports for the IHS to be enabled.

9. The method of claim 1, wherein the comparison of the detected I/O ports against the inventory from the inventory certificate identifies the detected I/O ports of the IHS to be disabled.

10. An IHS (Information Handling System) comprising:
    a plurality of I/O ports, wherein during factory provisioning of the IHS an inventory certificate is uploaded to the IHS, wherein the inventory certificate includes an inventory specifying a portion of the plurality of I/O ports of the IHS to be enabled ;
    one or more processors; and
    one or more memory devices coupled to the processors, the memory devices storing computer-readable instructions that, upon execution by the processors, cause the IHS to:
      retrieve the signed inventory certificate uploaded during factory provisioning of the IHS;
      collect an inventory of detected I/O ports of the IHS;
      compare the detected I/O ports against the inventory of the portion of I/O ports to be enabled from the inventory certificate in order to validate the IHS is operating using only the portion of the I/O ports included in the inventory certificate that was uploaded to the factory-provisioning of the IHS; and
      disable detected I/O ports of the IHS that are not validated as one of the portion of the I/O ports to be enabled based on the comparison to the factory-provisioned inventory certificate.

11. The IHS of claim 10, wherein the portion of I/O ports included in the inventory certificate is based on a listing of I/O ports for the IHS to be enabled that is specified by a purchaser of the IHS.

12. The IHS of claim 10, wherein any of the of the detected I/O ports of the IHS that are disabled are not usable by any software or hardware of the IHS.

13. The IHS of claim 10, wherein the inventory certificate including the portion of I/O ports to be enabled is uploaded to a persistent memory of the IHS during the factory provisioning of the IHS.

14. The IHS of claim 10, wherein the plurality of I/O ports comprise at least one of: a data port, a video port, a network port, a debugging port, and an audio port.

15. The IHS of claim 10, wherein execution of the instructions by the processors further causes the IHS to receive an updated inventory certificate that specifies an updated portion of the I/O ports for the IHS to be enabled.

16. A computer-readable storage device having instructions stored thereon for validating secure assembly and delivery of an IHS (Information Handling System) comprising a plurality of I/O ports, wherein execution of the instructions by one or more processors of the IHS causes a validation process of the IHS to:
  retrieve an inventory certificate uploaded to the IHS during factory provisioning of the IHS, wherein the inventory certificate includes an inventory specifying a portion of the plurality of I/O ports of the IHS to be enabled;
  collect an inventory of detected I/O ports of the IHS; and
  compare the collected inventory of detected I/O ports against the inventory of the portion of I/O ports to b enabled from the inventory certificate in order to validate the IHS is operating using only the portion of the I/O ports included in the inventory certificate that was uploaded to the factory-provisioning of the IHS; and
  disable detected I/O ports of the IHS that are not validated as one of the portion of the I/O ports to be enabled based on the comparison to the factory-provisioned inventory certificate.

17. The storage device of claim 16, wherein the validation that only the portion of the I/O ports to be enabled are operational on the IHS is conducted by a pre-boot validation process of the IHS.

18. The storage device of claim 17, wherein the pre-boot validation process is implemented by a remote access controller of the IHS.

19. The storage device of claim 18, wherein the storage device comprises a storage device of the remote access controller.

20. The storage device of claim 19, wherein the inventory certificate is uploaded to the storage device of the remote access controller during the factory provisioning of the IHS.

* * * * *

UNITED STATES PATENT AND TRADEMARK OFFICE
CERTIFICATE OF CORRECTION

PATENT NO. : 12,265,625 B2
APPLICATION NO. : 17/508930
DATED : April 1, 2025
INVENTOR(S) : Mukund P. Khatri, Marshal F. Savage and Jason Matthew Young It is certified that error appears in the above-identified patent and that said Letters Patent is hereby corrected as shown below:

In the Claims

In Column 26, Line 2, Claim 1, delete "validated as ne of the portion of the I/O ports to be" and insert -- validated as one of the portion of the I/O ports to be -- therefor.

In Column 26, Line 13, Claim 3, delete "the portion of the I/O ports to ben enabled are operational" and insert -- the portion of the I/O ports to be enabled are operational -- therefor.

In Column 26, Line 45, Claim 10, delete "ports of the IHS to be enabled ;" and insert -- ports of the IHS to be enabled; -- therefor.

In Column 27, Line 1, Claim 12, delete "The IHS of claim 10, wherein any of the of the" and insert -- The IHS of claim 10, wherein the -- therefor.

In Column 28, Line 3, Claim 16, delete "against the inventory of the portion of I/O ports to b" and insert -- against the inventory of the portion of I/O ports to be -- therefor.

Signed and Sealed this
Twenty-ninth Day of April, 2025

Coke Morgan Stewart
*Acting Director of the United States Patent and Trademark Office*